Feb. 11, 1941.   A. AMES, JR., ET AL   2,230,993
CORRECTING OCULAR DEFECTS
Filed Aug. 25, 1937   4 Sheets-Sheet 1
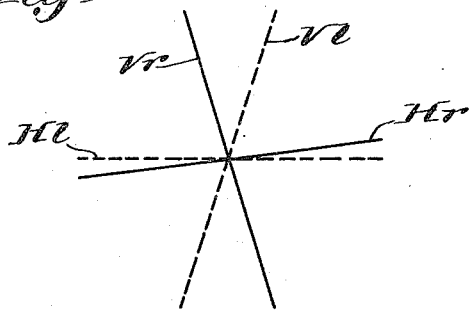
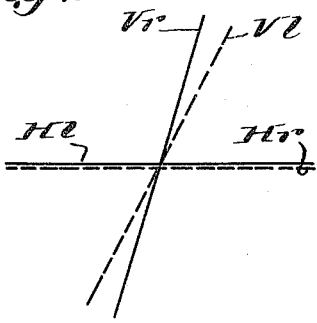
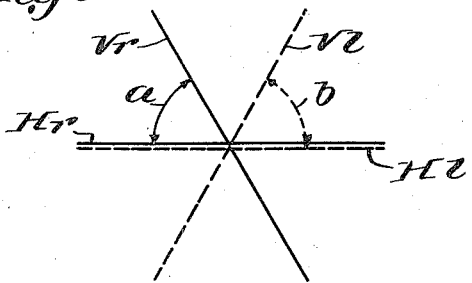
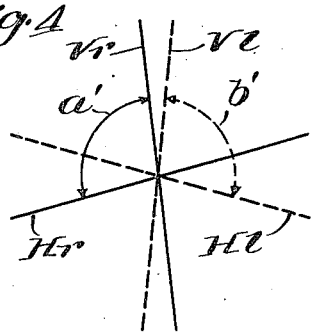
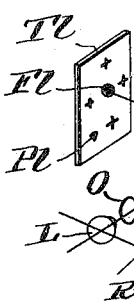
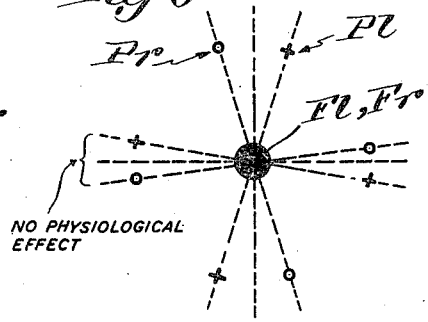
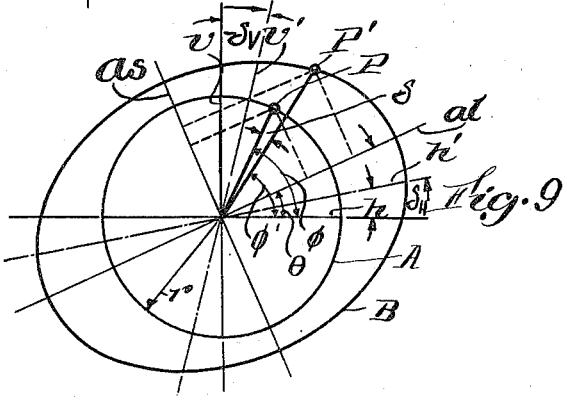

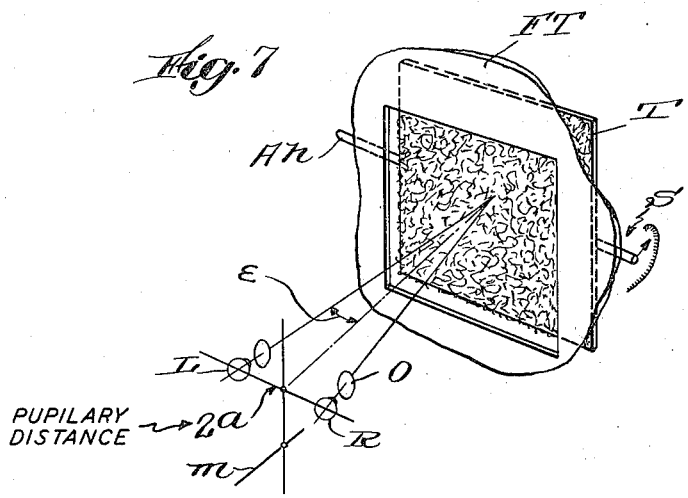
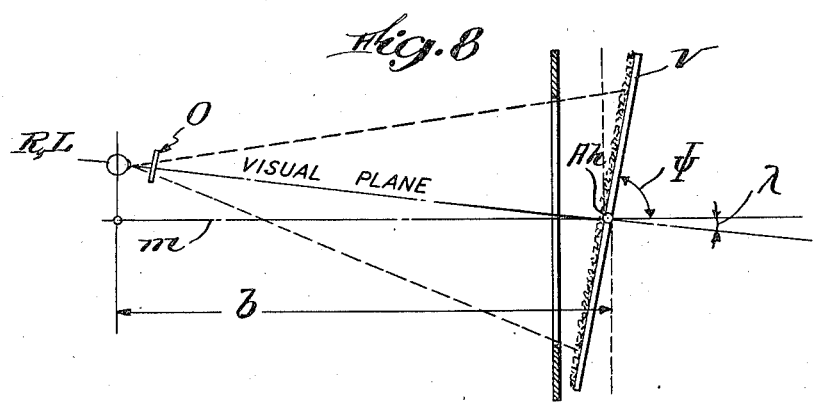
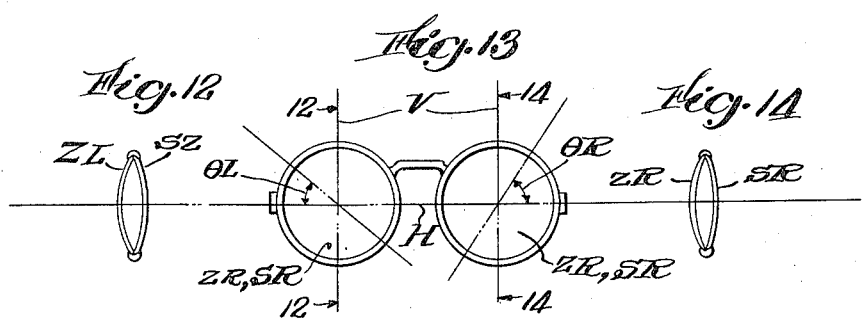

OBJECT FIELD "A" SEEN THROUGH LENS "Z" AS OCULAR IMAGE "B"

OCULAR IMAGES

LEFT EYE          RIGHT EYE

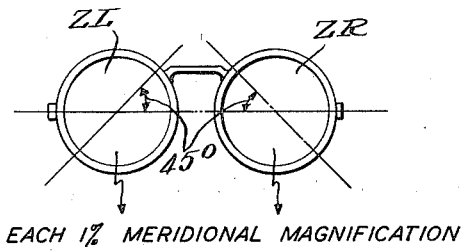
EACH 1% MERIDIONAL MAGNIFICATION
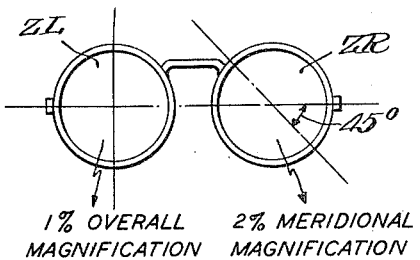
1% OVERALL MAGNIFICATION   2% MERIDIONAL MAGNIFICATION
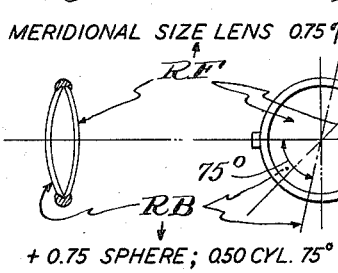
MERIDIONAL SIZE LENS 0.75%; θ = 45°
+ 0.75 SPHERE; 0.50 CYL. 75°
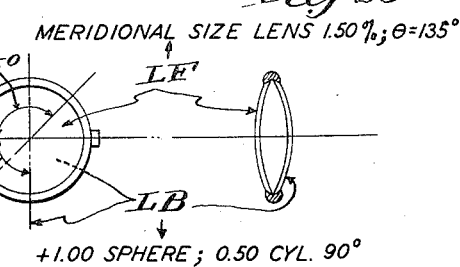
MERIDIONAL SIZE LENS 1.50%; θ = 135°
+ 1.00 SPHERE; 0.50 CYL. 90°

Patented Feb. 11, 1941

2,230,993

UNITED STATES PATENT OFFICE 2,230,993

CORRECTING OCULAR DEFECTS

Adelbert Ames, Jr., and Kenneth N. Ogle, Hanover, N. H., assignors to Trustees of Dartmouth College, Hanover, N. H., a corporation of New Hampshire Application August 25, 1937, Serial No. 160,784

7 Claims. (Cl. 88—20)

It has been found that differences of the conscious image producing functions of the respective eyes of a person, even if of comparatively small magnitudes, may cause serious visual, physiological and neurological disturbances, and that, for example, dimensional differences of the magnitude of 4% to 5% in many cases prevent fused binocular vision.

Such ocular defects are termed aniseikonia and defined as anomalous coordination of the eyes in binocular vision, due to incongruities of the ocular images of the respective eyes.

The term "ocular images" signifies in this context the impression reaching consciousness through the vision of one eye. The character of an ocular image, as its size or shape, is determined not only by the properties of the dioptric image as formed on the retina, but also by modifications due to the anatomical properties and physiological processes by which the optical image on the retina becomes effective in the higher brain centers.

It is impossible to determine by calculation or otherwise the exact configuration of an ocular image, but it is quite feasible to determine the relative properties of the ocular images of a pair of eyes during binocular vision under given conditions, as for example described in Letters Patent Reissue No. 19,841, of January 30, 1934. Incongruities clinically determined by such methods may be corrected by means of spectacles, as for example described in Letters Patent No. 1,933,578, of November 7, 1933.

The defects dealt with in these patents, by way of example, are of the nature of overall or meridional size differences. Ocular image incongruities may also involve prismatic distortions (perhaps caused by decentered elements of the ocular system) whose correction,—if desirable together with that of muscular defects,—is dealt with in Patent No. 2,118,132 to Adelbert Ames, Jr. et al., of May 24, 1938.

Still another aspect of aniseikonia involves rotary incongruities or declination anomalies, that is, angular deviations of the respective ocular images of a given object meridian which defect may also be regarded as an inherent characteristic of the above-mentioned meridional size differences.

The present invention is concerned with rotary ocular image incongruities and its principal object is to provide correction of such defects. This object, and other objects, aspects and features of the invention will be apparent from the following detailed description of concrete embodiments thereof. The description refers to drawings in which:

Figs. 1 to 4 are diagrammatic representations of rotary ocular image discrepancies;

Fig. 5 is a schematical view of a testing arrangement for detecting rotary ocular image incongruities;

Fig. 6 is a diagram showing an appearance of the targets of Fig. 5;

Figs. 7 and 8 are schematical views of another testing arrangement for detecting rotary ocular image incongruities;

Fig. 9 is a diagram in explanation of the rotary effect of astigmatic corrections;

Figs. 12, 13 and 14 are diagrammatical representations in elevation, and section, respectively, of the correction indicated in Fig. 11;

Figs. 16 to 20 are elevations, and sections, respectively, of spectacles constituting practical embodiments of the present invention.

Figure 10:
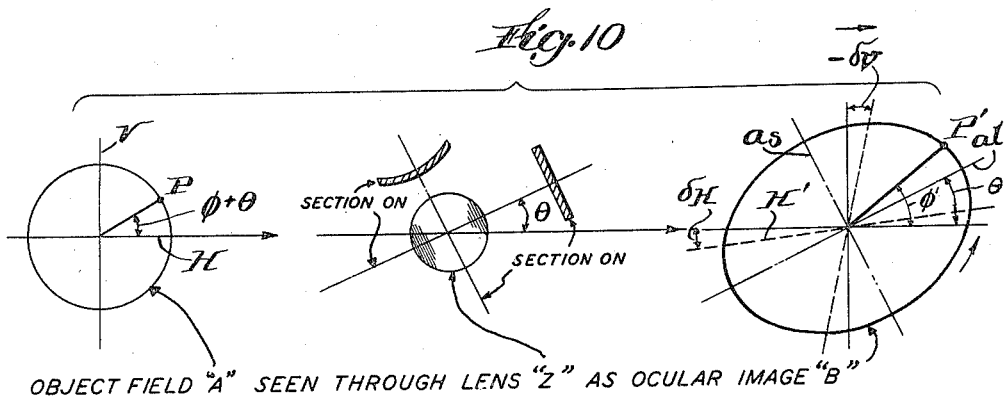
Fig. 10 is a diagram in explanation of the rotary effect of eikonic lenses.

The teachings of the science of ophthalmology permit the assumption that the vertical axes of the eyes (that is axes whose retinal elements convey consciousness of objects imaged thereon as being in vertical position) are fixed upon the retina; that is, an object meridian imaged upon such an axis will appear vertical regardless of whether or not the axis is actually vertical. It is further known that, in the case of most persons, these vertical axes are not parallel in the respective ocular images, but inclined, usually with the upper ends templewards to an amount of about 2° to 3° relatively to the median plane.

Such rotary incongruities may have anatomical causes as asymmetry of retinal elements (compare "Graefe's Archiv", volume 132, 1934, pages 101 et seq.), and it has been observed that there is a distinct difference between the behavior of meridians of different inclination to the median plane. Vertical meridians usually show greater relative rotary deviations than horizontal ones which fact has also been expressed by stating that the "quadrants of the retinal field" are unequal (v. Tschermak, "Optischer Raumsinn", page 856).

This can be explained as follows. Rotary incongruities of vertical meridians are always interpreted as an apparent dislocation of objects in space, whose actual location may be otherwise brought to consciousness. With some persons, depending among other circumstances upon their occupation, a large amount of such apparent dislocation may be harmless; with other persons a small amount might be detrimental, or at least annoying as, for example, causing disagreeable sensations when walking on ground which appears at an angle different from its actual location. Again, some persons have the opportunity or ability to reinterpret their erroneous space perception; others have not, and the nervous system of such persons may be seriously affected by this defect. It will therefore be seen that the necessity of correcting this defect will vary according to circumstances; with some persons, a comparatively large vertical rotary incongruity may be tolerated and not need special attention thereto whereas, in other instances, small defects of this nature might require correction.

Rotary incongruities of the horizontal meridians are not interpreted as discrepancies between apparent and actual location of objects in space. Without going into the theory of this difference, it may only be pointed out as its ultimate cause that, as a given biological fact, the eyes lie in a normally horizontal plane. If such horizontal discrepancies exceed the compensation possibilities due to the so-called fusional (Panum's) areas which permit fusion of the images of an object point not appearing on exactly corresponding elements of the respective ocular image fields, they may cause deficiencies of fusion, but this does of course not correspond to anything that could be interpreted as a phenomenon of space perception.

Concerning oblique axes, they can be resolved into vertical and horizontal components, to which the above considerations apply respectively.

Thus, ocular image incongruities of this type may be illustrated by way of representative ocular images of the respective eyes shown in superimposition as in Fig. 1, Vr and Vl being the right and left ocular images, respectively, of a vertical object meridian, and Hr and Hl corresponding ocular images of a horizontal meridian. Generally speaking, this displacement of the ocular images of intersecting object field meridians can be characterized as a "scissors effect."

The term "declination" as herein used refers to the relative angular deviation of the above-described apparent vertical axes of the eyes from the true vertical meridians. If these axes or diameters are rotated relatively to each other, about the visual axes of the respective eyes, so that the upper extremities are tipped templeward, the condition is called "disclination," whereas it is called "conclination" if the upper ends are tipped nasalward.

As mentioned above, the rotary incongruity effect of vertical meridians dominates, and the corresponding effect of horizontal meridians has for practical purposes little or no physiological effect. This condition, where rotary incongruity of horizontal meridians is either absent, or suppressed, is illustrated in Fig. 2.

Generally speaking, it is most important in these cases of rotary aniseikonia that the meridians of the ocular images have substantially the same angular relation as the corresponding object field meridians. For example, if the ocular images of crossing vertical and horizontal lines have the configuration indicated in Fig. 3, essential relief will be obtained if the ocular image angles $a$ and $b$ are opened to about 90°, as indicated at $a'$ and $b'$ of Fig. 4. The incongruence of Hr and Hl, respectively, will then most likely be suppressed, whereas the remaining small conclination either tolerated or compensated by way of a relative cyclo rotation of the eyes.

Abnormal declinations manifest themselves in every day life as follows: In conclination, for example, the top of a vertical plane appears to be tipped toward the observer, while the far end of a horizontal plane appears to be tipped up. In disclination, however, the top of a vertical plane appears tipped away from the observer, while the far end of a horizontal plane appears to be tipped down. In addition, in conclination a horizontal plane appears to be farther away from the observer, while in disclination the horizontal plane appears to be closer to the observer. As pointed out above, such defects of space perception require correction in many cases, especially if the patient has an occupation requiring correct judgment of spatial relations, apart from the non-visual disturbances which may be caused by such aniseikonic anomalies.

Rotary incongruities can be exactly measured by methods using for example targets described in the above-mentioned Letters Patent, Reissue No. 19,841. Such a method will now be shortly described.

Referring to Fig. 5, the patient's eyes R and L are located with respect to the lateral targets Tr and Tl and the vergence determined by means of transparent reflectors M and fixation object F. The targets have, in addition to fusion objects Fr and Fl similarly spaced test patterns Pr and Pl of dissimilar non-fusible character for the respective eyes, for example pin holes with light sources therebehind for target Tr and dark dots or crosses for target Tl.

If the patient has a rotary incongruity, the target will appear in superposition as for example shown in Fig. 6, indicating in this instance a conclination. Either by mechanically adjusting the targets, or by optical means O to be described hereinafter, the respective ocular images can be brought to coincidence, amplitudes and tolerances of rotary defects determined in this manner, and the condition investigated in all respects.

The declinations of ocular image meridians can also be determined by methods, and with instruments similar to those described in copending application, Serial No. 41,890, filed October 24, 1935. An instrument of this type is schematically indicated in Fig. 7. In this figure, T represents a surface having an irregular three dimensional pattern and mounted for rotation about a horizontal axis Ah perpendicular to the median plane, that is vertical plane through axis m. The adjustment of surface T can be measured, for example, with the aid of scale means s. A frame FT is preferably provided, for purposes explained at length in the above-identified copending application. Lens means O can be applied in front of the eyes L and R.

If a patient looking with his eyes R and L at this apparatus, as indicated in Figs. 7 and 8, sees surface T apparently tipped with its top toward him, he has a conclination defect whereas, if the top seems to be tipped backward, disclination is present. It was found that, for a visual distance of about 40 cm., a rotation of the test plane or field of 1° corresponds to a declination change of approximately 0.08°. For more exact investigations, tables can be computed, as for example the one below, in which (referring to Fig. 8) angle $\lambda$ of the visual plane is 23°, distance $b=39$ cm., $\Gamma = \Psi + \lambda$ is the inclination of the test field relatively to the visual plane, and $\delta$ the angle of declination, that is the inclination to a true vertical of the ocular image of a vertical. Positive values of $\delta$ indicate disclination, negative values conclination. As will be apparent from Figs. 7 and 8, $\tan (\Psi+\lambda) = \sin \epsilon \cot \delta$ wherein $$\sin \epsilon = \frac{a}{\sqrt{a^2+b^2}}$$

$a$ is one-half the pupillary distance and $\epsilon$ the convergence angle in the visual plane.

*Table I*

| $\Gamma$ degree | $\delta$ degree |
|---|---|
| 105 | −1.55 |
| 100 | −0.98 |
| 95 | −0.46 |
| 90 | 0.00 |
| 85 | +0.43 |
| 80 | +0.84 |
| 75 | +1.23 |

The above examples will be sufficient to show for present purposes, that the relative angular positions of the ocular images of certain object field meridians can be experimentally determined with considerable accuracy.

Declination irregularities may be of organic nature; however, they may also be caused by the correction of certain types of astigmatism. Taking as most general examples oblique compound astigmatism (where both Sturm lines are on one side of the retina) or oblique mixed astigmatism (where the Sturm lines are on either side of the retina), correction of such dioptric defects introduces an overall as well as a meridional dimensional incongruity, and in addition a rotary incongruity, as will now be explained somewhat more in detail with reference to Fig. 9.

In Fig. 9, A represents the ocular image of a circular object field. An emmetropic eye having no organic defects involving distortion of the ocular image sees this object as a circle, with radius $r$. If an eye does not have such distortional defects, but one of the above astigmatic defects, and if it has been corrected for this compound astigmatism by a lens having spherical and cylindrical power, circle A will be imaged on the retina as an ellipse B. The major axis of the ellipse is in the meridian of greatest magnification, and the minor axis in the meridian of lowest magnification, these meridians being usually referred to as principal meridians.

The space meridian through any point on the object field circle (represented by P on the undistorted ocular image A), will be imaged at P′, the relation of P and P′ being determined by the magnifications in the two principal meridians. At any rate, angle $\Phi$ will be different from $\Phi'$, and this means that the meridian through P has been rotated by the correction; in the present case, if Fig. 9 represents for example the conditions of the left eye, a conclination has been introduced. It can be shown mathematically that the declination change of a meridian depends only upon the ratio of the magnifications in the principal meridians. It will now also be evident that the declination change of any two meridians corresponds to the above-discussed scissors movement; in Fig. 9, the true and apparent verticals and horizontals are indicated at $v$ and $v'$, and $h$ and $h'$, respectively, clearly showing this effect.

Although the declination effect of astigmatic lenses can be calculated, it is preferable to determine this defect by subjective measurements as above described.

It will now be evident that, if for example only one eye needs astigmatic correction, or if the astigmatic correction is different for the respective eyes, the relation of corresponding ocular images of given object meridians will be similar to the previously discussed organic declination defects; in either case, the difference of the ocular images of two object meridians can be defined as rotary incongruity.

According to the present invention, rotary incongruities are corrected by applying to one eye, or to both eyes, meridional zero power magnification lenses which compensate these rotary incongruities, or by shaping glasses correcting other defects in such a manner that they provide additional effects equivalent to those of such zero power lenses. Such corrective lenses will now be discussed.

It may be assumed that an object field comprising a circle A (Fig. 10) is observed by a normal eye through a meridional zero power magnification lens Z, as indicated by the cross-sections of Fig. 10. The magnification of the lens being different in the two principal axes (namely, $M_a$ and $M_b$, being the maximum and minimum magnifications, respectively), circle A will be seen as ellipse B, the relation of A and B being, of course, quite similar to the elements similarly denoted in Fig. 9. True verticals and horizontals V and H will appear as V′ and H′ at angles of $\delta_V$ and $\delta_H$.

By elementary mathematics, the following relation of the angles involved can be deducted:

$$\tan(\Phi'-\theta) = \frac{M_b}{M_a}(\tan \Phi - \theta) \quad (1)$$

$$K = \frac{M_b}{M_a} \quad (2)$$

$$-\delta = \Phi' - \Phi \quad (3)$$

$$\tan \delta = -\frac{(K-1)\tan(\Phi-\theta)}{1+K\tan^2(\Phi-\theta)} \quad (4)$$

$$\tan \delta_V = -\frac{(K-1)\cot \theta}{1+K\cot^2 \theta} \quad (5)$$

$$\tan \delta_H = \frac{(K-1)\tan \theta}{1+K\tan^2 \theta} \quad (6)$$

The following table gives the vertical and horizontal declination changes $\delta_V$ and $\delta_H$ for various magnification ratios K and for various angles $\theta$ of the meridian effecting the maximum magnification $M_a$, counted from the horizontal meridian.

*Table II*

Giving $\delta_V$ and $\delta_H$ values, in degrees, where: $d$=difference of magnification, in per cent:

$$(M_a - M_b)\frac{100}{M_a}$$

K=magnification ratio $\frac{M_b}{M_a}$ $\theta$ = angles, in degrees, of principal axis with magnification $M_a$.

| d | K | δ | θ | | | | | |
|---|---|---|---|---|---|---|---|---|
|   |   |   | 0 | 30 | 60 | 90 | 120 | 150 |
| 2 | 0.98 | V | 0.00 | −.49 | −.48 | 0.00 | +0.48 | +0.49 |
|   |      | H | 0.00 | +.48 | +.49 | 0.00 | −0.49 | −0.48 |
| 4 | 0.96 | V | 0.00 | −0.98 | −.96 | 0.00 | +0.96 | +0.98 |
|   |      | H | 0.00 | +0.96 | +.98 | 0.00 | −0.98 | −0.96 |
| 6 | 0.94 | V | 0.00 | −1.47 | −1.42 | 0.00 | +1.42 | +1.47 |
|   |      | H | 0.00 | +1.42 | +1.47 | 0.00 | −1.47 | −1.42 |

Interpreted in terms of binocular vision as for example indicated in Fig. 6 showing the right eye and left eye ocular images in superimposition, and using the nomenclature of Figs. 6 and 10, with the indices $r$ and $l$ for the right and left eye, respectively, it is the algebraic difference $\Sigma\delta$ of the individual declinations $\delta_r$ and $\delta_l$ that affects space perception, according to the general relation $$\Sigma\delta = \delta_r - \delta_l \qquad (7)$$

Accordingly, for vertical meridians, the physiologically effective declination will be $$\Sigma\delta_V = \delta_{Vr} - \delta_{Vl} \qquad (8)$$

and for horizontal meridians $$\Sigma\delta_H = \delta_{Hr} - \delta_{Hl} \qquad (9)$$

In accordance with the sign convention herein used, if $\Sigma\delta_v$ is positive there is an effective conclination, that is, the tops of the vertical meridians are moved toward the center of the head as indicated in Fig. 6 and if $\Sigma\delta_v$ is negative there is an effective disclination of the vertical meridian, that is, the tops of the vertical meridians are moved toward the temples.

It will now be evident that declination defects can be compensated by rotating the meridians of ocular images (as represented by the ocular image of the vertical object field meridian) back into (or nearer to) normal position, by selecting, for example with the aid of Table II, a meridional size lens having the desired effect represented by angle $\delta_v$. The change in the ratio of the size of the respective ocular images, if detrimental, is compensated by suitable lens elements, or component lens properties equivalent to such lens elements. This type of correction will become clearer from the following more detailed discussion with reference to Fig. 11.

Figure 11:
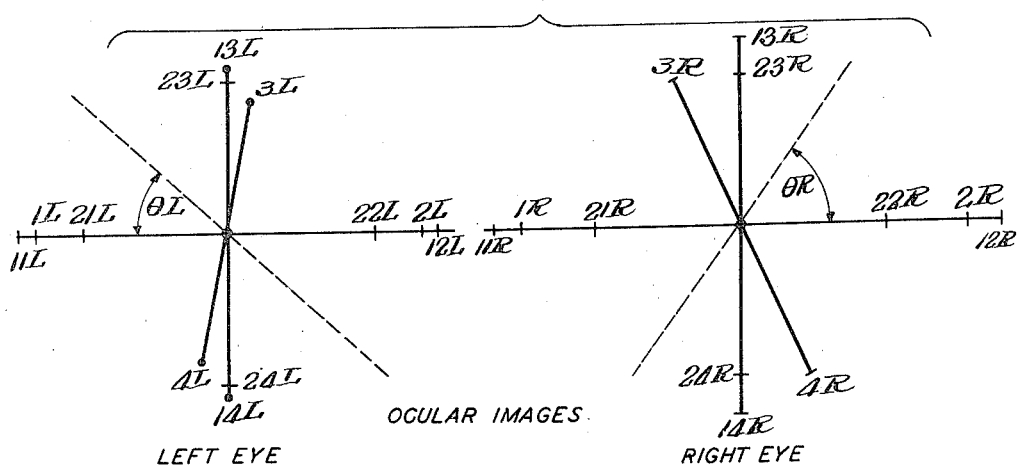
Fig. 11 is a diagram in explanation of declination correction in accordance with the present invention.

In Fig. 11, the ocular images of an object field circle are indicated by their vertical and horizontal meridians, 1L—2L, 3L—4L and 1R—2R, 3R—4R indicating these meridians. It is assumed that a conclination was experimentally detected, that the declinations are different in the respective eyes and that the magnification ratios in the respective meridians are not zero.

Zero power magnification lenses with magnification ratio K and angle θ are now selected (for example with the aid of compilations or graphs similar to Table II) which lenses (whose principal axes are indicated by their angles θZ and θR) rotate the vertical meridians into tolerable positions 13L—14L and 13R—14R, respectively, but cause a change of the magnification ratios, indicated by the different lengths of 11L—12L, 11R—12R and 13L—14L and 13R—14R, respectively. In order to correct these magnification differences, meridional zero power elements with vertical or horizontal magnification axes can be added, if necessary, equalizing the meridians, as indicated at 21L—22L, 21R—22R and 23L—24L and 23R—24R, respectively.

The following table indicates the magnifications in the vertical and horizontal meridians to be expected as effect of zero power lenses primarily used for correcting declination defects.

*Table III*

V and H indicate the vertical and horizontal meridians, respectively, for which the magnifications are given in per cent, for various values of θ, and magnification differences $d$ in per cent.

| d | Meridian of lenses | Declination θ | | | | | |
|---|---|---|---|---|---|---|---|
|   |   | 0 | 30 | 60 | 90 | 120 | 150 |
| 2 | V | 0.00 | 0.50 | 1.50 | 2.00 | 0.50 | 1.50 |
|   | H | 2.00 | 1.50 | 0.50 | 0.00 | 1.50 | 0.50 |
| 4 | V | 0.00 | 1.00 | 3.00 | 4.00 | 1.00 | 3.00 |
|   | H | 4.00 | 3.00 | 1.00 | 0.00 | 3.00 | 1.00 |
| 6 | V | 0.00 | 1.50 | 4.50 | 6.00 | 1.50 | 4.50 |
|   | H | 6.00 | 4.50 | 1.50 | 0.00 | 4.50 | 1.50 |

Figs. 12, 13 and 14 indicate the above described corrections; in these figures ZL and ZR are the declination corrective lenses and SL and SR the auxiliary size corrective lenses. ZL and ZR are ground symmetrically to the axes indicated by angles L and R whereas SL and SR are symmetric to the eikonic meridians V and H which, generally speaking, are vertical or horizontal.

It will be understood that the above example is quite general, and that the defects will frequently be of much simpler nature so that one or several of the corrective elements can be omitted. It will also be understood that elements correcting power defects will usually be included in the correction actually worn by the patient. In actual practice, not more than two superimposed lens elements will be used for each eye, including the power elements, the power and size effects being appropriately distributed. Preferably, one element for each eye will be a zero power lens, compensating declination and at the same time the residual magnification differences; but it is also feasible to select lens elements free of this limitation, for example by methods disclosed in Patent No. 2,118,173 to A. F. Dittmer, of May 24, 1938.

Figure 15:
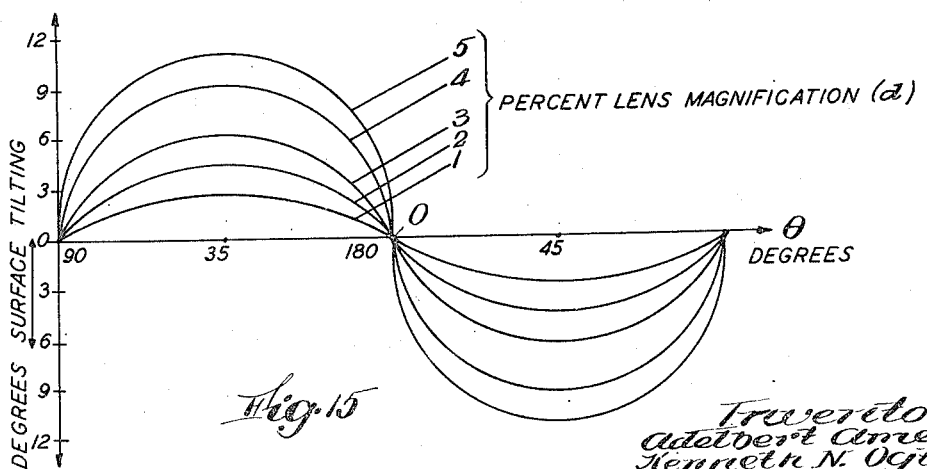
Fig. 15 is a diagram illustrating the relation between corrective lenses and the reading of a testing instrument.

The correction which has been more or less approximately determined by way of computation is preferably checked clinically, as above indicated. Especially convenient in this connection is a test with the tipping field as indicated in Figs. 7 and 8; it was found that the tilting of the testing surface, due to declination defects, has definite relations to corrective zero power lenses, as given in the diagram of Fig. 15.

The invention will now be further explained with reference to several practical examples.

I. Clinical examination of a patient indicated the absence of dioptric defects, but the presence of a vertical excess conclination of 0.5° for each eye. In accordance with the procedure outlined above, it was determined that a 1% meridional zero power size lens, placed at 45° before the right eye, and a similar lens placed at 135° before the left eye correct the declination defect. Since the lenses are equal and their effective meridians at 90°, their magnification effects compensate each other, making an additional size correction unnecessary. This correction is shown in Fig. 16.

The same effect could be obtained by placing a 2% meridional zero power magnification lens at 45° before the right eye. This would correct the entire declination defect, but introduce in the vertical and horizontal (eikonic) meridians size differences which, since the lens is placed at 45°, are equal for these meridians. This size difference can be corrected by means of a 1% overall size lens before the other eye. This embodiment is shown in Fig. 17.

II. A patient wearing the correctly determined dioptric prescription given below had considerable reading trouble, and was suffering from headaches and nervous disturbances.

Right eye +0.75 sphere, 0.50 cylinder 75° axis
Left eye +1.00 sphere, 0.50 cylinder 90° axis Investigation on a tipping field instrument as diagrammatically shown in 7 indicated the presence of declination. It was further found that this declination could be corrected by means of a meridional size lens of 0.75% magnification placed at θ=45° before the right eye and a 1.50% meridional size lens placed at θ=135% before the left eye. These lens are so dimensioned that size differences are not introduced, as above explained.

This correction was applied, as indicated in Figs. 18 to 20, causing substantial disappearance of the above symptoms. These figures, RF and LF are the zero power components mounted as front elements of lens doublets, whereas RB and LB are the dioptric lenses mounted as ocular lens elements.

It should be understood that the present disclosure is for the purpose of illustration only and that this invention includes all modifications and equivalents which fall within the scope of the appended claims.

I claim:

1. Eyeglass for correcting an ocular image incongruity manifesting itself through a difference in angular position of the ocular image of an object field meridian with respect to the actual position of said object field meridian, comprising lens holding means, and a lens element having thickness, and surface curvatures differing in perpendicular axes of symmetry of said element to effect a ratio K of the magnifications in said axes, said lens elements being mounted in said frame at an angle θ of its axis of higher magnification to the horizontal meridian and hence rotating the image of an object meridian at an angle Φ to the horizontal meriden, through an angle δ, and the negative tangent of δ being substantially $$\frac{(K-1) \tan (\Phi-\theta)}{1+K \tan^2 (\Phi-\theta)}$$

whereby said angle δ compensates within the physiological tolerance said difference in angular position.

2. Eyeglass for correcting an ocular image incongruity manifesting itself through a difference in angular position of the ocular image of an object field meridian with respect to the actual position of said object field meridian, comprising lens holding means, a lens element having thickness, and surface curvatures differing in perpendicular axes of symmetry of said element to effect a ratio K of the magnifications in said axes, said lens elements being mounted in said frame at an angle θ of its axis of higher magnification to the horizontal meridian and hence angle Φ to the horizontal meridian, through an angle δ, and the negative tangent of δ being substantially $$\frac{(K-1) \tan (\Phi-\theta)}{1+K \tan^2 (\Phi-\theta)}$$

whereby said angle δ compensates within the physiological tolerance said difference in angular position, and, superposed on said lens element, lens means having thickness and surface curvatures effecting in the horizontal and vertical eikonic meridians magnifications substantially equal but opposite to the magnifications, in said eikonic meridians, of said lens element.

3. Eyeglass for correcting ocular defects including astigmatism, comprising lens holding means, mounted in said lens holding means cylindrical power lens means correcting a predetermined degree of astigmatism and effecting through their meridional magnification difference a rotary deviation of the image of an object field meridian, and superimposed in said holding means a lens element having a meridional magnification ratio opposed to at least part of said meridional magnification difference of said power lens means, in order to compensate for said rotary deviation.

4. The method of correcting defects of binocular vision manifesting themselves through relative rotation of the respective ocular images of an object field meridian, which relative rotation has been measured by forming in the respective eyes of a person images of a test object defining a characteristic object field meridian and comparing the rotary deviation of the ocular images of said characteristic meridian, comprising optically rotating the light rays in said characteristic meridian of at least one of the light beams which carry the images to the eyes, by differently magnifying said image in two perpendicular meridians thereof without moving the image plane, said perpendicular meridians being selected to form such angles to said characteristic meridian that the rotation of object field meridians due to said different magnification substantially compensates said rotary deviation.

5. The method of correcting defects of binocular vision manifesting themselves through relative rotation of the respective ocular images of an object field meridian, which relative rotation has been measured by forming in the respective eyes of a person images of a test object defining a characteristic object field meridian and comparing the rotary deviation of the ocular images of said characteristic meridian, comprising optically rotating the light rays in said characteristic meridian of at least one of the light beams which carry the images to the eyes, by magnifying said image in two perpendicular meridians thereof to different amounts without moving the image plane, said perpendicular meridians being selected to form such angles to said characteristic meridian that the rotation of object field meridians due to said differential magnification substantially compensates said rotary deviation, and changing, in eikonic meridians, the image dimensions to amounts substantially equal but opposite to the magnifications due to said differential magnifications.

6. Eyeglass for correcting an ocular image incongruity manifesting itself through a difference in angular position of the ocular images of the respective eyes, of an object field meridian with respect to the actual position of said meridian, comprising lens holding means, and two lens elements having thickness, and surface curvatures differing in perpendicular axes of symmetry of said elements respectively, to effect ratios $K_r$ and $K_l$ of the magnifications in said axes respectively, said lens elements being mounted in said frame for observation therethrough of said object field by the right and left eye, respectively, at angles $\theta R$ and $\theta L$ of their axes of higher magnification to their respective horizontal meridians and hence rotating the images of an object meridian at an angle $\Phi$ to the horizontal meridian, through angles $\delta_r$ and $\delta_l$ respectively, the negative tangents of $\delta_r$ and $\delta_l$ being substantially $$\frac{(K_r-1)\tan(\Phi-\theta R)}{1+K_r\tan^2(\Phi-\theta R)}$$

and $$\frac{(K_l-1)\tan(\Phi-\theta L)}{1+K_l\tan^2(\Phi-\theta L)}$$

and the algebraic difference of $\delta_r$ and $\delta_l$ being within the physiological tolerance for angular incongruities of said ocular images of an object meridian.

7. Eyeglass for correcting an ocular image incongruity manifesting itself through a difference in angular position of the ocular images of the respective eyes, of a vertical object field meridian with respect to the actual position of said object field meridian, comprising lens holding means, and two lens elements having thickness, and surface curvatures differing in perpendicular axes of symmetry of said elements respectively, to effect ratios $K_r$ and $K_l$ of the magnifications in said axes respectively, said lens elements being mounted in said frame for observation therethrough of said object field by the right and left eye, respectively, at angles $\theta R$ and $\theta L$ of their axes of higher magnification to their respective horizontal meridians and hence rotating the images of said vertical object meridian through angles $\delta_{vr}$ and $\delta_{vl}$ respectively, the negative tangents of $\delta_{vr}$ and $\delta_{vl}$ being substantially $$\frac{(K_r-1)\cot\theta R}{1+K_r\cot^2\theta R}$$

and $$\frac{(K_l-1)\cot\theta L}{1+K_l\cot^2\theta L}$$

and the algebraic difference of $\delta_r$ and $\delta_l$ being within the physiological tolerance for angular incongruities of said ocular images of an object meridian.

ADELBERT AMES, JR.
KENNETH N. OGLE.